Sept. 26, 1967 R. F. SPESHYOCK 3,343,657
CONTACT LENS CONDITIONING FACILITY
Filed Sept. 2, 1966 2 Sheets-Sheet 1
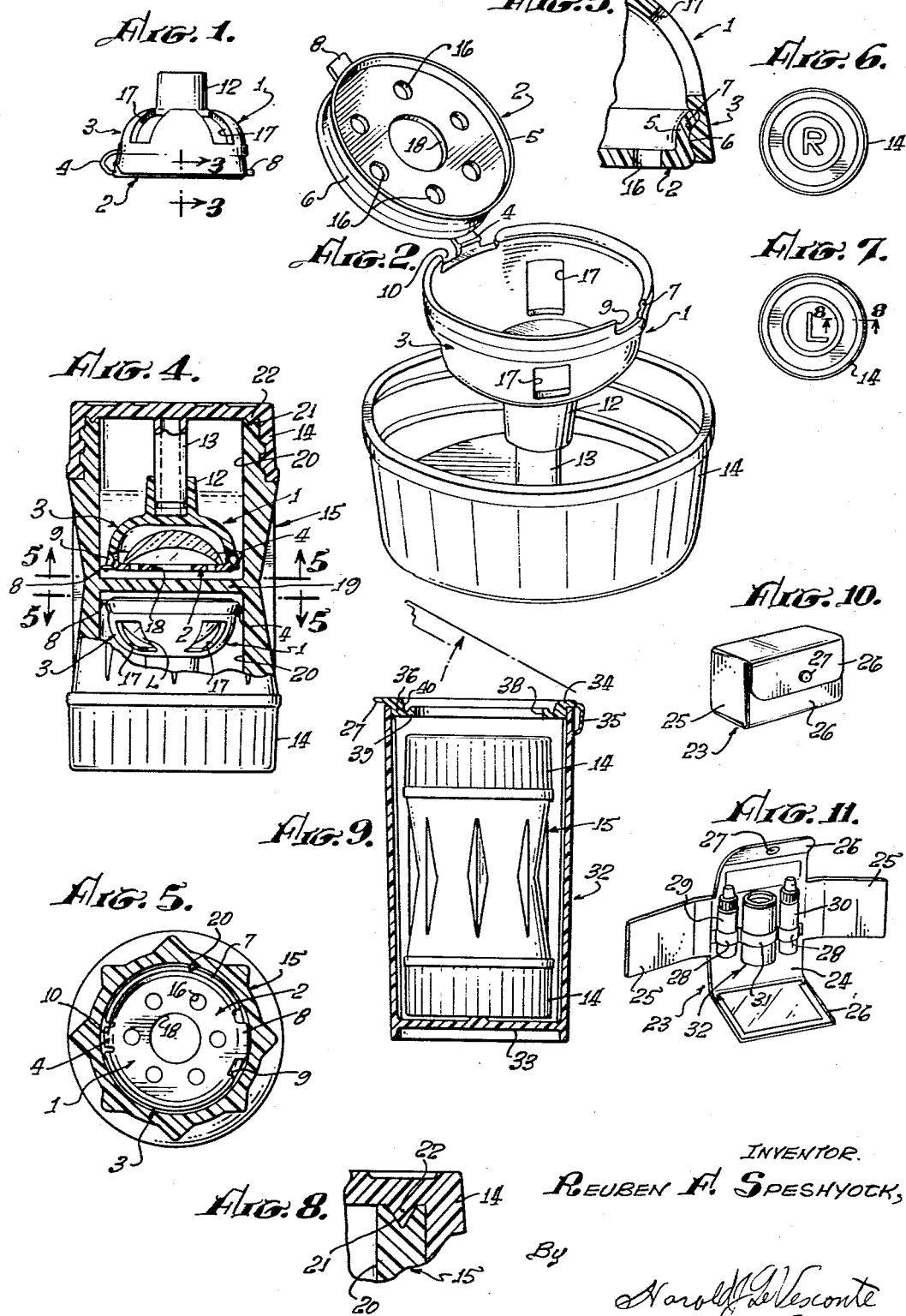
INVENTOR.
REUBEN F. SPESHYOCK,
By
Harold LeVesconte
ATTORNEY.

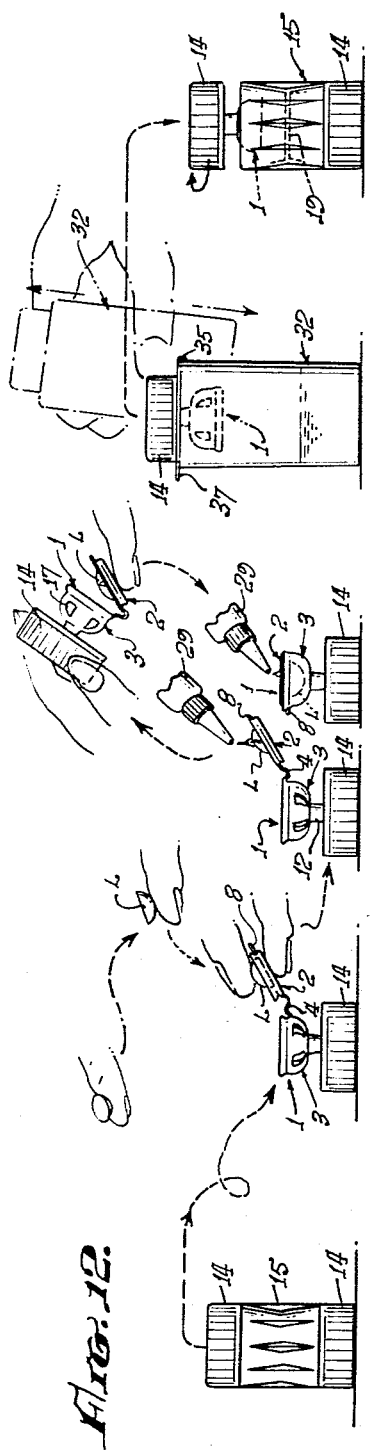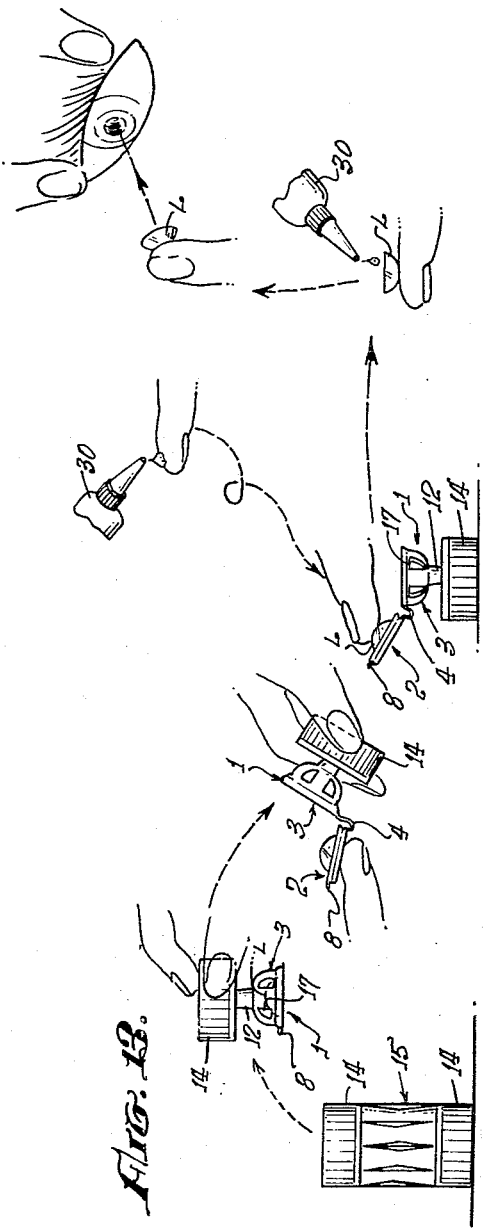

United States Patent Office 3,343,657
Patented Sept. 26, 1967

3,343,657
CONTACT LENS CONDITIONING FACILITY
Reuben F. Speshyock, 3221 Mills Ave.,
La Crescenta, Calif. 91014
Filed Sept. 2, 1966, Ser. No. 576,894
11 Claims. (Cl. 206—5)

This invention relates to the care and preservation of contact lenses during the periods when they are not being worn, such care and preservation as well as the means and devices hereinafter described being collectively referred to as "conditioning."

In Patent No. 3,211,281, granted to the present applicant and another Oct. 12, 1965, a means is provided in which the contact lenses, when not being used, are held in suspension in a container of an antiseptic fluid by means carried by the closure cap for the container; said means including members depending from the closure cap and having opposed parallel grooves engageable with opposite points on the peripheral edges of the lens. This means, while requiring less tactile engagement with the lens than any device then existing, necessitated the provision of closure caps having differently spaced grooves for different ranges of sizes of lenses, presented the possibility of wrong size application and also some secondary handling deriving from misuse of the most efficient routine.

Contact lenses are thin, carefully and exactly shaped, shallow, bits of transparent plastic having a concavo-convex configuration of such interior and exterior curvatures as to serve as a suitable lens for the eye of the user and when these lenses are not being worn, they must be carefully cared for under conditions which will maintain them in optimum usable condition. It has been found that a contact lens, if allowed to dry, undergoes a change in configuration and therefore, when a lens is not being worn, it should be maintained in the normal hydrated condition that exists while it is being worn. When the lens is being worn it is in contact with tears and mucus. If these fluids are allowed to dry onto the lens surface after the lens has been removed from the eye, a film is formed on the lens and the removal of the film thus formed will involve a need to scrub the lens surface after the film has been at least somewhat softened by a suitable detergent solution. This scrubbing, regardless of how delicately performed, is particularly difficult to perform without subjecting the lens to scratching, smudging, deforming or contaminating of that surface with resultant insult to the eye. Taking these factors into consideration, the present invention provides a means whereby immediately upon removal of a lens from the eye, it can be treated with a detergent solution and rinsed to remove tears, mucus or contaminants adhering thereto before the lens is placed in the antiseptic hydrating solution in which contact lenses are intended to be kept when not being worn and by such washing and rinsing, not only readily cleanse the lens, but also preserve the integrity of the lens and the antiseptic solution. Additionally, the physical portions of the invention should be such that all sizes of lenses are accommodated by the same equipment and of such material that the surfaces thereof are not affected by the antiseptic hydrating solution contained therein. Further, these devices must be of such a character that they can be sterilized by boiling without danger of deleterious working or of accumulating mineral deposits which could adversely affect the surface of a lens.

With respect to the storage of the sterile, bactericidal and hydrating solution after thus sterilizing the container, the container should be such that the lens can be placed therein and removed therefrom without contact of the antiseptic solution by the fingers to further preserve the integrity of the solution.

Having all of the foregoing considerations in mind, the principal objectives of the present invention are the provision of a contact lens conditioning facility, the term "conditioning," as here used, relating to and including all that happens to a contact lens to preserve the integrity thereof during the periods while it is not being worn and including the devices hereinafter described for preserving the lens' integrity and characterized by a reduction of the extent of required tactile engagement with the lens, complete freedom from engagement of the lens with any surface that might either mar or contaminate it, capacity to cleanse the lens without tactile engagement therewith, and capacity to engage a lens for transfer to the eye directly by the solution applied to the insertion finger surface employed for the function to eliminate finger smudges while offering compatibility to normal eye lacrimal fluid.

With the foregoing objects in view together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification, and in which drawings FIGS. 1–11 show the structural details of the apparatus and FIGS. 12 and 13 show the mode of use thereof.

In the drawings:

FIG. 1 is a side elevational view of the principal component of the invention, hereinafter called the lens chamber, the component being shown in approximately its actual size and in its closed, lens housing position, FIG. 2 is a greatly enlarged, perspective view of the lens chamber in open position and at an angle such as viewed at the times of placing a lens thereon or removing a lens therefrom, the associated member which serves both as a supporting base and as a hydrating solution container closure cap being also shown, FIG. 3 is a further enlarged, fragmentary, sectional view taken on the line 3—3 of FIG. 1 showing the resilient interlock between the lens conditioning tray portion, hereinafter referred to as the "tray," and the lens enclosing portion of the chamber, FIG. 4 is a side elevational view of the generally cylindrical antiseptic and hydrating solution container, a portion thereof being shown in section on the plane of the axial line of the container.

FIG. 5 is a transverse sectional view as taken on either of the lines 5—5 of FIG. 4, FIGS. 6 and 7 are end elevational views of the container illustrating the means of tactile identification of the respective end cap elements, FIG. 8 is a greatly enlarged, fragmentary, sectional view taken as on the line 8—8 of FIG. 7 and showing the fluid sealing means between the caps and the end surface of the sterile solution container, FIG. 9 shows a lens washing or rinsing component and additionally, illustrates an additional utility thereof as a carrying means for the sterile solution container, FIG. 10 is a perspective view of a typical lens maintenance kit in which the present invention is incorporated, FIG. 11 shows the kit opened for use, FIG. 12 is a semi-diagrammatic illustration of the steps involved in employing the present invention in the transfer of a contact lens from the eye of a user to the sterile solution container, and FIG. 13 is a similar illustration of the steps involved in the transfer of a contact lens from the sterile solution container to the eye of the user.

The principal physical component of the invention is a novel lens chamber such as shown in FIG. 1. As here shown, the lens chamber 1 is formed as a single molding of a slightly resilient, semi-rigid plastic material which, preferably, is capable of withstanding sterilization by immersion in boiling water. This lens chamber includes as its principal component parts the lens conditioning tray or base portion 2, hereinafter referred to as the "tray," and the associated lens housing portion 3 of hollow, dome-shaped configuration, hereinafter referred to as the "housing," said portions being interconnected by a thin, integrally molded strip portion 4 which is sufficiently thin to be flexible and to operate as a hinge member between the two portions of the chamber.

The tray is of disk-like configuration and is provided with a peripheral wall 5 on the surface thereof which cooperates or combines with the flat open side of the housing to form the enclosure for a lens, the outer peripheral surface of said wall being of slightly less diameter than the interior diameter of the complementary edge of the housing having a groove 6 which, due to the resilient character of the plastic material from which the chamber is molded, has a snap-in fit with a mating bead 7 on the complementary inner surface of the housing. The inner diameter of said wall is somewhat greater than the largest diameter of contact lens to be confined in the lens chamber.

Diametrically opposite the hinge member 4, the tray is provided with an outwardly projecting lug 8 which is received in a lug notch 9 formed in the end of the housing wall and the diametrically opposite edge portion of the housing is interrupted by a notch 10 from the inner edge of which the end of the hinge strip 4 projects, the said notch thus affording clearance so that the peripheral flange portion 11 of the tray outwardly of the wall 5 may fit closely against the end surface of the housing when the tray and housing are interengaged to form the chamber for a lens.

The outer or rounded end of the housing is provided with a cylindrical sleeve 12 formed integrally therewith and disposed in the axial line of the lens chamber, said sleeve having a tight friction fit over a hollow cylindrical stud 13 depending from the inner surface of an internally threaded screw cap 14 for one end of a container 15 of an antiseptic fluid in which the lens is hydrated when not in use, said cap and container to be hereinafter described in detail. The tray 2 interiorly of the area defined by the wall 12 and the side walls of the housing 3 are provided, respectively, with openings 16 and 17 through which various fluids may contact a lens enclosed in the chamber as will be presently described and, additionally, the tray is provided with a larger central opening 18 for another purpose also to be presently described in detail.

The container 15 together with a pair of the caps 14 each associated with one of the lens chambers forms a storage means for a pair of contact lenses when they are not being worn, the caps having suitable indicia on their outer surfaces for tactile identification of right and left as, for example, the molded raised letters "L" and "R" (see FIGS. 6 and 7) on the end surfaces thereof, it being remembered that a person who is required to wear contact lenses may be either nearly or completely sightless without them. Moreover, the caps are of such configuration that they may be inverted and thus serve to hold the associated lens chamber in inverted position above a surface to facilitate the procedure of transferring a lens to or from the chamber and the eye of the user. As will be later apparent, this configuration has an additional utility in preventing the loss of a lens from dropping it on a floor surface.

The container 15 as here shown is cylindrical in shape and is hollow. At its midlength it is provided with an integrally formed wall 19 dividing the interior of the container into two identical compartments 20, 20 into each of which a lens chamber carried by an associated cap 14 may be inserted. Each compartment carries a sufficient quantity of a suitable antiseptic solution to cause a lens housed in the chamber to be submerged and hydrated when the cap is screwed into place and leakage of the fluid is prevented by a sealing means comprising an annular, V-shaped groove 21 formed in the end of the container and adapted to be wedgingly engaged by a complementary annular V-shaped rib 22 on the inner end surface of the cap 14. The cap and container are preferably formed of moldings of a plastic material having only such resilience as will cause the groove 20 and rib 21 to make a liquid tight seal when the cap is screwed down against the end of the container. Additionally this type of seal will accommodate slight warping deriving either from initial deformation of the parts or resulting from boiling incident to sterilization of the parts. The container here shown, except for the sealing means above described, is similar to that shown in FIG. 13 of my said prior patent.

FIGS. 12 and 13 show a typical lens conditioning kit in which the present invention is incorporated. This kit may, for example, comprise a case 23 having a rigid, rectangular back member 24 and flexible cover members projecting from each edge thereof including overlapping end members 25, 25 and overlapping side members 26, 26 adapted to overlie the end members 24, 24 and to be detachably secured to each other by a suitable means such as the snap button components 27 and 27'. The back portion 24 carries parallel loops of plastic 28, 28 adapted to hold squeeze bottle type dispensing containers 29 and 30 of detergent and wetting solutions and a larger intermediate loop 31 which holds the lens washing component 32 of the kit.

The lens washing component 32 comprises a cylindrical plastic container of a length and diameter sufficient to enclose the solution storage and lens hydrating component with the caps assembled thereon wherefore, the strap 31 of the case serves to hold both of these elements when they are not being employed in the maintenance procedure of a lens. The lens washing component comprises a tubular plastic molding and includes an integral bottom wall 33 and with an integrally molded end ring 34 at the opposite end thereof and connected to said opposite end by a thin, flexible, integrally molded link member 35, said end ring having a skirt portion 36 tightly fitting the end of the container and an end flange 37 engaging the end surface of the container. The end ring 34 is further provided with an opening 38 therethrough which is of greater diameter than the lens protecting component, said opening being bordered by an annular ledge portion 39 engageable by the end surface of either of the caps 14 and the outer limit of said ledge terminating in an annular wall 40 with which the outer bottom edge surface of the cap 14 has a friction tight fit. Since the opening 38 is of lesser diameter than the cap 14 and the container 15, the storage unit may be retained in the washing component when it is not being employed, the mode of storage being shown in FIG. 9.

Having described the structural features and details of the invention, the mode of use showing the reasons for the specific configuration of certain of the elements will now be described. In this description, FIG. 12 illustrates the steps involved in transferring a lens to storage and FIG. 13 shows the steps involved in taking a lens from its sterile, hydrating position and installing it on the eye of the user. For the sake of convenience in description, it will be assumed that the right hand is involved in manipulation of the lens.

Referring now to the procedure illustrated in FIG. 12 it will be assumed that the solution storage container has the required amounts of antiseptic liquid in each compartment and at the time of this procedure, does not hold any lens therein. The container is positioned on end on a table with the cap 14 which designates the lens, right or left, to be removed uppermost. The cap and its associated lens chamber is removed from the container and is placed in inverted position on the table surface and the tray portion is opened out beyond the housing portion in a position in which the lens supporting surface thereof is disposed at an angle of, say, between 30° and 15° from the horizontal. In this position, it is prepared to receive a lens.

The lens L, after being removed from the eye, is then picked up by the forefinger of the right hand, which has been wetted with the wetting solution, and is located with the convex surface thereof disposed on the tip of the previously wetted index finger. It is held thereon by the viscosity combined of the residual eye fluid on the said convex surface and the wetted surface of the finger. The lens is then brought over near the opened out tray, and the finger and lens are inverted to position the lens with the concave surface downwardly on the tray, the tray being supported underneath by the index finger of the left hand. The right index finger is then moved laterally generally parallel to the plane of the tray surface so that the finger, in effect, wipes itself off of contact with the lens, the lens being retained by engagement with the inner surface of the wall 5 of the tray.

The next step is to apply a few drops of detergent solution on the exposed convex surface of the lens. The lens is then enclosed in the chamber by holding the tray portion in an approximately horizontal attitude by one or two fingers of the right hand while swinging the cap and housing portion as a unit over and into engagement with the outer surface of the wall 5 with consequent snap-in engagement between the groove 6 and rib 7 on the opposed surfaces. The cap and the now closed chamber are again inverted and placed on the table and a few more drops of detergent solution are applied to the concave surface of the lens through the hole 18 in the tray.

The washing component is partially filled with water and the end ring component thereof is pressed into place in the end of the container. The cap is placed on the ledge 39 of the end ring with the chamber and the enclosed lens disposed inside the washing component and the unit thus formed is shaken vigorously to rinse the detergent and any contaminants off of the lens surfaces.

The cap and lens chamber are then removed from the washing component and shaken to remove excess water therefrom and are placed on and in the solution storage component 15 screwing the cap on tightly and thus submerging the cleansed lens in the antiseptic solution in the compartment of the storage component. Following this, the solution storage component is inverted to present the other end cap and the same steps are followed with respect to the lens on the other eye.

It is particularly to be noted that touching of the lens is reduced to an absolute minimum and that as soon as the lens is removed, it is cleansed and rinsed, wherefore, the body of antiseptic hydrating solution is prevented from becoming contaminated. Moreover, it is to be noted that the cleansing of the lens is performed at a time when any contamination on the surface thereof is still in fluid form wherefore, it can be readily dissolved and removed. Still further, it is to be noted that neither the concave nor the convex surface of the lens is contacted physically by anything, the surface tension of the fluid on the convex surface of the lens, as it is removed from the eye serves additionally to retain the lens on the previously wetted finger as the finger is being inverted to position the lens on the tray and thus protect the lens surface from contact with the surface of the index finger. Still further, the plastic from which the protecting component is formed is at least not harder than the plastic from which the lens is formed and accordingly, is incapable of marring the surface of a lens contained therein. Still further, since the antiseptic fluid and the material from which the lens is formed are of substantially equal specific gravity, the surface tension of the fluid will maintain at least a film thereof between the lens and the interior surface of the chamber and thus further assuring that the lens surface will not be impaired.

Referring finally to FIG. 13, the container is placed on end on a table surface with the desired one of the end caps ("L" or "R") uppermost and the unit comprising the cap and chamber is unscrewed and removed from the chamber. The unit is first shaken to remove excess fluid and, still held in the attitude it occupied in the container, is tapped lightly against the other hand or the table surface to insure that the lens is brought into contact with the tray. While holding the tray in an approximately horizontal position with one hand, the rest of the unit is swung by the other hand about the hinge formed by the strip 4 until it is in inverted position and the unit is then placed on the table surface with the lens exposed and resting on the opened tray. The tip of the right index finger is then wetted with wetting solution. This solution is slightly saline and in all respects is the equivalent of tears. The solution on the finger tip is then touched to the convex surface of the lens and the finger is moved directly upwardly from the tray with the surface tension of the wetting solution operating to adhere the lens to the finger. As soon as the lens is clear of the tray, the finger is inverted to bring the concave side of the lens uppermost and a few drops of wetting solution are applied to the said concave surface. The lens is then inserted on the eye in the usual manner.

The tray is then moved into closed position and the cap and chamber unit replaced on the container after which, the container is turned end for end and the same procedure followed for inserting the other lens in the other eye. When the lenses are installed, the washing component may be emptied, the container replaced in the washing component and it and the wetting solution returned to the kit until again required.

In this procedure, as in the procedure of removing and storing a lens, it is to be noted that tactile engagement with the lens is reduced to an absolute minimum. For all practical purposes, since the wetting solution forms a film between the finger and the lens surface, there is no actual tactile engagement with the lens whatever in inserting a lens in the eye.

While in the foregoing specification there has been disclosed a presently preferred embodiment of the invention, it is not to be inferred that the invention is limited to the precise details of construction thus disclosed by way of example, and it will be understood that the invention shall be deemed to include all such changes and modification in the parts, and in the construction, combination and arrangement of parts as shall come within the purview of the appended claims.

I claim:

1. In a contact lens conditioning means, a lens containing chamber comprising a dome-shaped lens housing portion having an open end and a perforate side wall, a perforate, lens supporting tray portion connected to said housing portion and having detachable, self securing engagement with the open end of said dome portion to complete the formation of said chamber; said housing portion having means at a point thereon remote from said open end affording detachable engagement with an interior face of a closure cap for a container of fluid by which a contact lens confined in said chamber is to be treated.

2. A contact lens containing chamber means as claimed in claim 1 in which housing portion and said tray portion are connected by a thin strip of flexible plastic material serving as a hinge between said portions.

3. A contact lens containing chamber as claimed in claim 1 in which the lens contacting side of said tray portion includes means effective to prevent movement of a lens resting on said tray to be moved therefrom by movement parallel to the plane of said lens contacting side thereof.

4. A contact lens containing chamber as claimed in claim 1 in which said tray portion is provided with a peripheral wall which is received in said open end of said dome portion and which serves as a confining means operating to hold the edges of a contact lens supported thereon against engagement with the edge of said housing portion incident to enclosure of a lens in said chamber.

5. A contact lens containing chamber as claimed in claim 1 in which the face of said tray portion which forms part of the interior wall of said chamber is provided with perforations allowing fluid applied to the exterior surface of said tray portion to enter said chamber and contact the concave surface of a contact lens confined in said chamber with the said concave surface thereof disposed next to said tray portion.

6. A contact lens containing chamber as claimed in claim 1 in which said housing portion includes a cylindrical sleeve projecting in the axial line of said housing portion away from the said open end of said housing portion and adapted for a friction fit with a portion of a container closure cap.

7. In combination, a contact lens containing chamber as claimed in claim 1 and a fluid container closure cap having a member projecting from an internal surface thereof and having an outer end surface normal to the axial line of said projecting member; said member terminating in an end on which said housing is mounted with a friction fit; said combined cap and chamber when removed from a fluid container being capable of being inverted with said cap serving as a supporting base for said chamber.

8. A contact lens containing chamber as claimed in claim 2 in which said housing portion, said tray portion and said thin strip are formed as an integral molding of a resilient plastic material, and in which said tray portion and said housing portion have snap-in interlockingly surface areas affording said detachable, self-securing engagement therebetween.

9. A contact lens containing chamber as claimed in claim 2 in which said hinge forming strip is of such weakness as to require manual support as an incident to effecting tactile engagement of a lens supported thereon.

10. A contact lens contacting chamber as claimed in claim 4 in which said peripheral wall additionally provides a surface having snap-in interlocking engagement with a complementary surface of said housing portion to effect the enclosure of a lens within said chamber.

11. A combined lens containing chamber and container closure cap as claimed in claim 6 in which said tray portion and said housing portion of said chamber are connected by hinge forming means operative to allow said tray to be positioned in opened out relation when said chamber and cap are in said inverted position with resultant positioning of the lens contacted side of said tray upwardly for reception of a lens to be enclosed in the chamber or removal of a lens therefrom for placement in the eye of the user.

References Cited
UNITED STATES PATENTS

| | | | |
|---|---|---|---|
| 2,540,758 | 2/1951 | Rinnman | 220—17 |
| 3,088,634 | 5/1963 | Rosekrans et al. | 220—17 |
| 3,101,087 | 8/1963 | Watson | 206—5 |
| 3,124,240 | 3/1964 | Croan | 220—17 |

THERON E. CONDON, *Primary Examiner.*

W. T. DIXSON, JR., *Assistant Examiner.*